United States Patent
Fogwill et al.

(10) Patent No.: US 12,163,934 B2
(45) Date of Patent: *Dec. 10, 2024

(54) PARALLEL INSULATED CHROMATOGRAPHY COLUMNS

(71) Applicant: Waters Technologies Corporation, Milford, MA (US)

(72) Inventors: Michael O. Fogwill, Uxbridge, MA (US); Martin Gilar, Franklin, MA (US); Joseph D. Michienzi, Plainville, MA (US); Wade P. Leveille, Douglas, MA (US); Geoff C. Gerhardt, Woonsocket, RI (US); Jeffrey Musacchio, Sharon, MA (US); Jason F. Hill, Milford, MA (US); Sylvain G. Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/354,234

(22) Filed: Jun. 22, 2021

(65) Prior Publication Data
US 2021/0396721 A1 Dec. 23, 2021

Related U.S. Application Data

(60) Provisional application No. 63/042,364, filed on Jun. 22, 2020.

(51) Int. Cl.
*G01N 30/46* (2006.01)
*G01N 30/02* (2006.01)
(Continued)

(52) U.S. Cl.
CPC ............ *G01N 30/46* (2013.01); *G01N 30/30* (2013.01); *G01N 30/32* (2013.01);
(Continued)

(58) Field of Classification Search
CPC ....... G01N 2030/027; G01N 2030/328; G01N 30/20; G01N 30/30; G01N 30/32;
(Continued)

(56) References Cited

U.S. PATENT DOCUMENTS 6,217,829 B1 * 4/2001 Mustacich ............. G01N 30/30
422/89
7,576,037 B2 * 8/2009 Engelhardt ............. C40B 60/14
506/37

(Continued)

FOREIGN PATENT DOCUMENTS

WO    WO-0045929 A1 *  8/2000  ............. G01N 30/20

*Primary Examiner* — Peter J Macchiarolo
*Assistant Examiner* — Gedeon M Kidanu
(74) *Attorney, Agent, or Firm* — Goodwin Procter LLP

(57) ABSTRACT

The exemplary embodiments may provide a collective insulating sleeve for a plurality of chromatography columns or may provide separate insulating sleeve for each of the chromatography columns in a plurality. As a result, column ovens are not needed, and pre-heaters may not be required for each chromatography column in some exemplary embodiments. Thus, parallel column arrangements in the exemplary embodiments may be more compact than conventional arrangements.

15 Claims, 20 Drawing Sheets

(51) Int. Cl.
*G01N 30/30* (2006.01)
*G01N 30/32* (2006.01)
*G01N 30/72* (2006.01)
*G01N 30/74* (2006.01)

(52) U.S. Cl.
CPC . *G01N 2030/027* (2013.01); *G01N 2030/328* (2013.01); *G01N 30/7233* (2013.01); *G01N 30/74* (2013.01)

(58) Field of Classification Search
CPC .. G01N 30/46; G01N 30/466; G01N 30/6043; G01N 30/7233; G01N 30/74; G01N 35/1097
See application file for complete search history.

(56) References Cited

U.S. PATENT DOCUMENTS

2017/0282096 A1* 10/2017 Bouvier ................. B01D 15/20
2020/0182837 A1* 6/2020 Iwata ................... G01N 30/466
2022/0050091 A1* 2/2022 Sugiyama .............. G01N 30/46

* cited by examiner

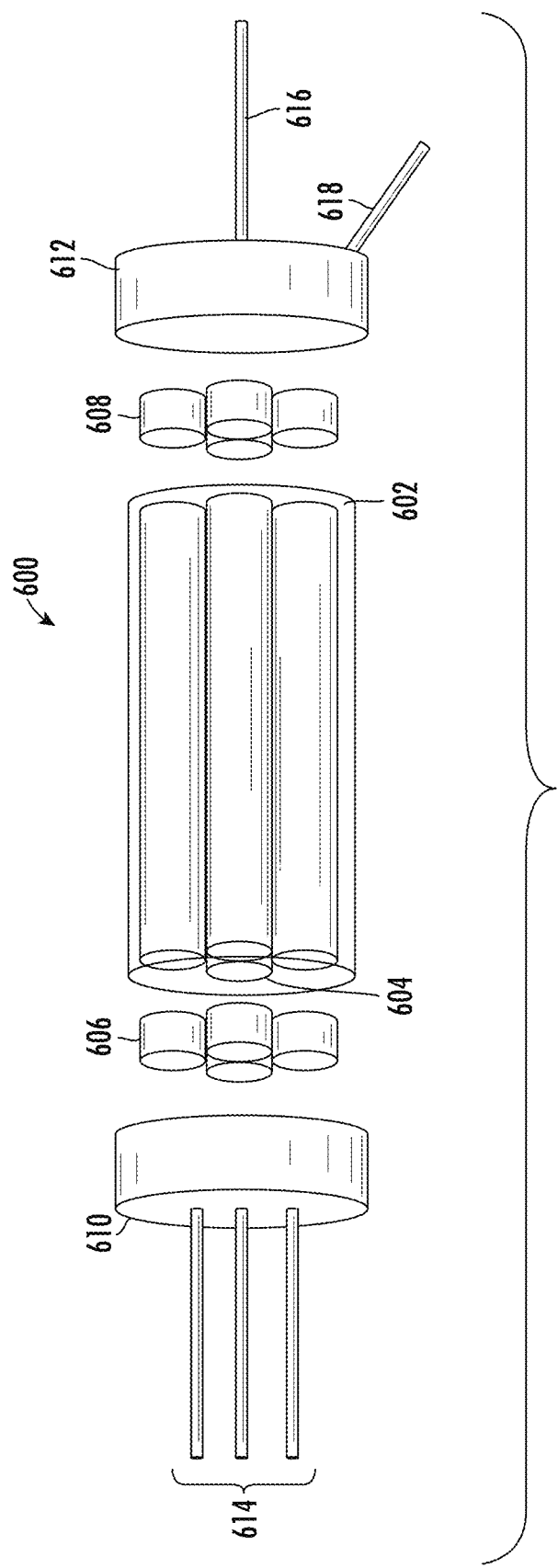

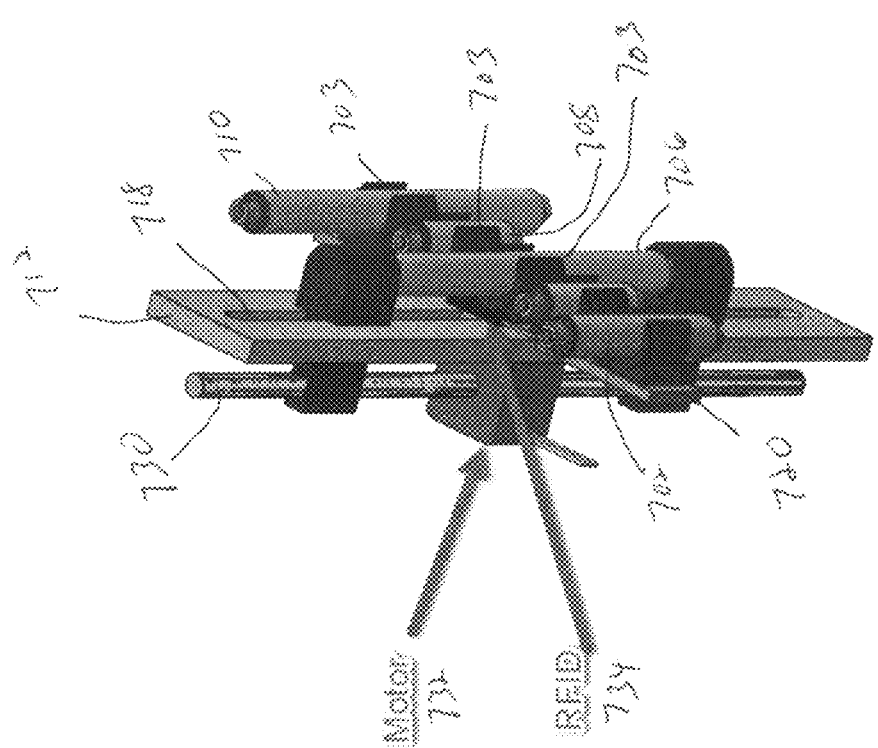

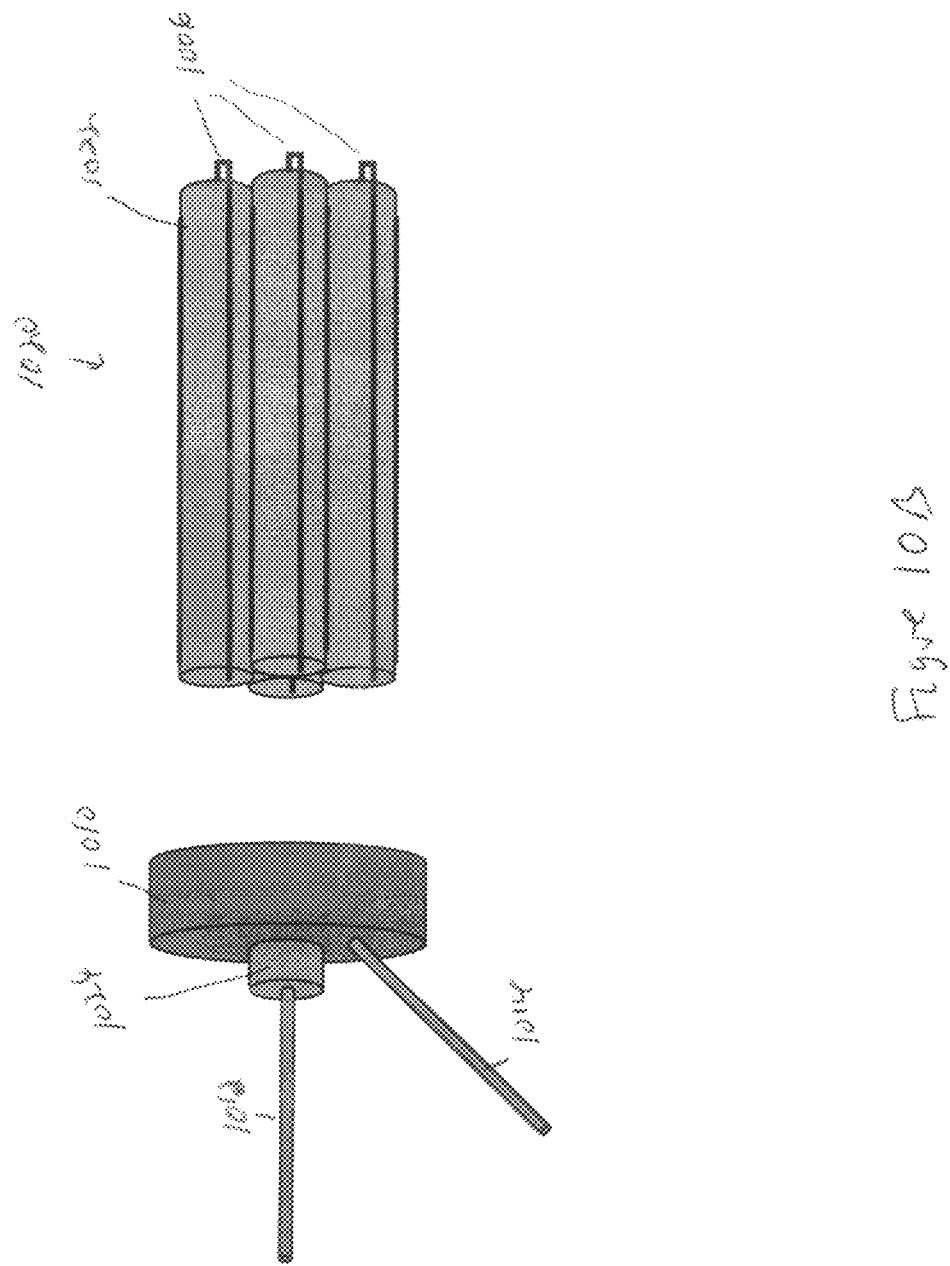

PARALLEL INSULATED CHROMATOGRAPHY COLUMNS

CROSS-REFERENCE TO RELATED APPLICATIONS

This application claims the benefit of and priority to U.S. Provisional Patent Application No. 63/042,364, filed on Jun. 22, 2020, the entire contents of which is hereby incorporated by reference.

BACKGROUND

Chromatography columns may be used independently as single columns. Chromatography columns may also be used in parallel. FIG. 1 depicts a conventional arrangement for using chromatography columns in parallel in a liquid chromatography mass spectrometry (LCMS) system 100. The LCMS system includes a mobile phase pump 102 for pumping mobile phase toward an inlet selection valve 106. A sample introduction injector 104 injects samples of analyte into the mobile phase flowing from the mobile phase pump 102. The inlet selection valve 106 directs the mobile phase and analyte in parallel to chromatography columns 108. Each chromatography column (numbered 1 through n) is in a respective column oven (also numbered 1 through n). A pre-heater (APH) is provided in the respective column oven for each column to preheat the mobile phase with the analyte. The combination of the column ovens and the pre-heaters helps to reduce thermal gradients in the chromatography columns. An outlet selection valve 110 selects output from the columns and passes the output to a detector 112, such as found in an MS system.

SUMMARY

In accordance with an exemplary embodiment, a chromatography columns arrangement, includes a plurality of chromatography columns, where each of the chromatography columns has an inlet and an outlet. The arrangement also includes an insulating sleeve surrounding the plurality of chromatography columns to insulate the plurality of chromatography columns. The arrangement further includes an inlet selection valve positioned at inlet ends of the chromatography columns in the plurality for controlling input of mobile phase and analyte to the chromatography columns and an outlet selection valve positioned at outlet ends of the chromatography columns in the plurality for controlling output of the mobile phase and the analyte from the chromatography columns.

The arrangement may further include mobile phase heaters positioned before the inlets of the chromatography columns for heating the mobile phase. The inlet selection valve may have an inlet interface for interfacing with an inlet tube for inputting the mobile phase and the analyte. The outlet selection valve may have an outlet interface for interfacing with an outlet tube for outputting the mobile phase and the analyte. The chromatography columns may be liquid chromatography columns. There may be, for instance, 4 chromatography columns, 6 chromatography columns or 8 chromatography columns in the plurality of chromatography columns. More generally, there may be a different number of chromatography columns than 4, 6, or 8 columns. The numbers of chromatography columns shown is intended to be illustrative and not limiting. The insulating sleeve may be, for example, one of a vacuum sleeve, a sleeve of insulating material or a sleeve containing gas.

The inlet selection valve may interface with a first end of the insulating sleeve to form a first end of the chromatography columns arrangement. The outlet selection valve may interface with a second end of the insulating sleeve to form a second end of the chromatography columns arrangement. The inlet selection valve may be configured to pass the mobile phase and the analyte in parallel to the chromatography columns in the chromatography column arrangement. The inlet selection valve may have an inlet interface for each respective chromatography column in the plurality of chromatography columns, wherein each of the inlet interfaces is for interfacing with a respective inlet tube for inputting a mobile phase an analyte to the respective chromatography column. The inlet selection valve may be configured to input the mobile phase and the analyte via the respective inlet tubes to the respective chromatography columns in parallel. The output selection valve may have an analyte outlet interface for interfacing with an analyte outlet tube for outputting the analyte from the plurality of chromatography columns and a mobile phase interface for interfacing with a waste output tube leading to waste for outputting the mobile phase from the plurality of chromatography columns. The arrangement may further include mobile phase heaters positioned after the outlets of the chromatography columns for heating the mobile phase and the analyte.

In accordance with an exemplary embodiment, a chromatography columns arrangement includes a plurality of chromatography columns, each of the chromatography columns having an inlet and an outlet, and each of the chromatography columns having a separate insulating sleeve. The arrangement also includes an inlet selection valve positioned at inlet ends of the chromatography columns in the plurality for controlling input of mobile phase and analyte to the chromatography columns, wherein the input selection valve is configured to only allow one of the chromatography columns at a time to receive the mobile phase and the analyte as input, and an outlet selection valve positioned at outlet ends of the chromatography columns in the plurality for controlling output of the mobile phase and the analyte from the chromatography columns.

The outlet selection valve may be configured to select as output the mobile phase and analyte exiting the outlet of a single one of the chromatography columns in the plurality at a time. The inlet valve may contain an inlet interface with an inlet tube for carrying the mobile phase and the analyte. The arrangement additionally may include at least one inlet mobile phase heater for heating the mobile phase and the analyte prior to being input to the chromatography columns arrangement. The arrangement may include an inlet selection valve controller for controlling the inlet selection valve to select each of the chromatography columns in the plurality to receive the input mobile phase and analyte in accordance with a sequence. At least one of the insulating sleeves may be a vacuum sleeve, a sleeve of insulating material or a sleeve containing gas.

In accordance with an exemplary embodiment, a chromatography columns arrangement includes a plurality of chromatography columns and an insulating sleeve surrounding the chromatography columns for insulating the chromatography columns.

The arrangement may include an input face plate at a collective input end of the plurality of chromatography columns and an output face plate at a collective output end of the plurality of chromatography columns. The input face plate may contain at least one valve for controlling inputs to the plurality of chromatography columns. The output face plate may contain at least one valve for controlling outputs to the plurality of chromatography columns. The insulating sleeve may be one of a vacuum sleeve, a sleeve of insulating material or a sleeve containing gas.

BRIEF DESCRIPTION OF THE DRAWINGS

FIG. 6A depicts a third exemplary embodiment of a parallel column arrangement.

FIGS. 7A-7D depicts a fourth exemplary embodiment for a parallel column arrangement.

FIG. 10B depicts a sixth exemplary embodiment of a parallel column arrangement using a single selection valve and separate insulating sleeves for the chromatography columns.

DETAILED DESCRIPTION

Figure 1:
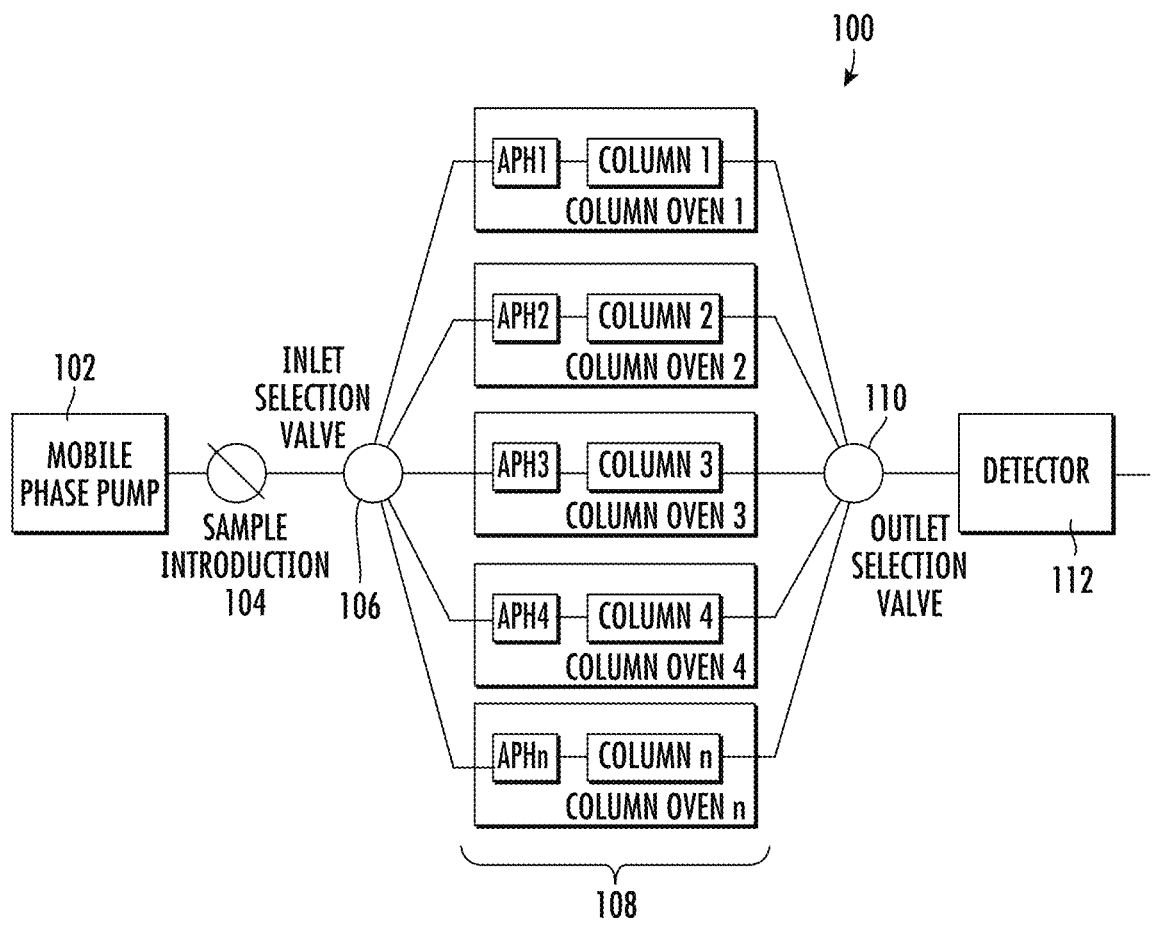
FIG. 1 depicts a block diagram of a conventional parallel column LCMS system.

One of the difficulties with a conventional arrangement for parallel chromatography columns like that shown in FIG. 1 is the large footprint required. Each column requires a column oven, which occupies a great deal of space. Moreover, each column requires a pre-heater that occupies additional space and increases cost. Further, the bulky nature of the conventional arrangement limits the ability to place the columns near detection, such as optical (TUV, PDA, etc.) detectors or mass spectrometers. Placing the column far from the detection decreases the performance of the system due to the band broadening experienced as the analyte traverses the tubing from the outlet of the column to the inlet of the detector.

The exemplary embodiments may overcome these difficulties of the conventional arrangement of FIG. 1 by eliminating the need for column ovens and, is some embodiments, pre-heaters for each chromatography column. The exemplary embodiments may provide a collective insulating sleeve for a plurality of chromatography columns or may provide separate insulating sleeves for each of the chromatography columns in a plurality. As a result, column ovens are not needed, and pre-heaters may not be required for each chromatography column in some exemplary embodiments. Thus, parallel column arrangements in the exemplary embodiments may be more compact than conventional arrangements. In addition, the chromatography columns may be arranged in close proximity in novel arrangements that facilitate the novel functionality described below.

The chromatography columns of the exemplary embodiments may be liquid chromatography columns or supercritical fluid columns. The columns may be packed columns, open tubular columns, or packed capillary columns. The chromatography columns may be gas chromatography columns, but thermal gradients typically are less of an issue for gas chromatography columns.

The insulating sleeves may be vacuum sleeves or may be sleeves of insulating material. Where an insulating sleeve is a vacuum sleeve, the vacuum area may be evacuated and in some cases, may then be filled with a gas of lower thermal conductivity than air, such as at least one of: helium, hydrogen, neon, nitrogen, oxygen, carbon dioxide, argon, sulfur hexafluoride, krypton, and xenon. The vacuum sleeve may be a tube having walls made of steel or titanium, and the vacuum area may be formed in an area between sealed walls of the tube. The insulating sleeve, instead of being a vacuum sleeve, may be made from an insulating material like polystyrene foam (Styrofoam®), or more generally, any material exhibiting low thermal conductivity to act as an insulating member. Polymers such as polymethacrylate, silicone, urethane, polyolefins, polyamide, polysulfone, polyetheramide, polycarbonate, rubber, polyester, polyfluoroelastomers and polyethylene terephthalate, and the like, may also be used to form the insulating sleeve. Additionally, ceramics, such as aerogels, fibrous materials, such as methylcellulose, fiberglass and the like, may also be used to form the insulating sleeve.

Figure 2A:
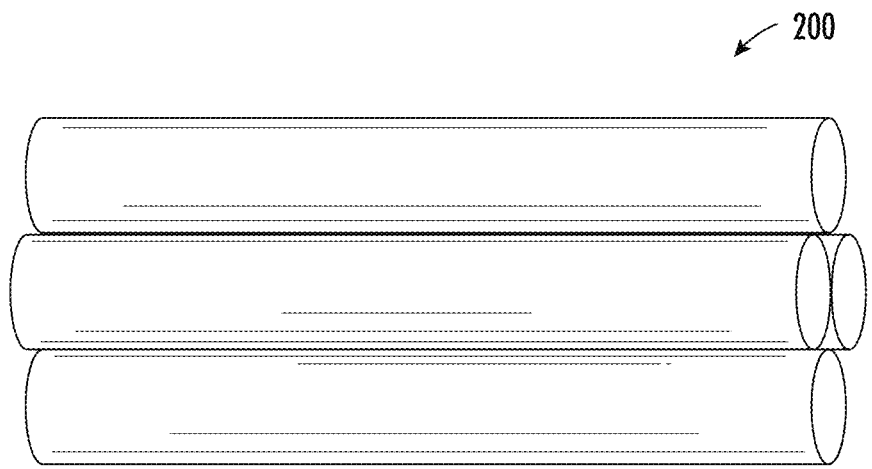
FIG. 2A depicts an illustrative clustering of chromatography columns in a parallel arrangement.
Figure 2B:
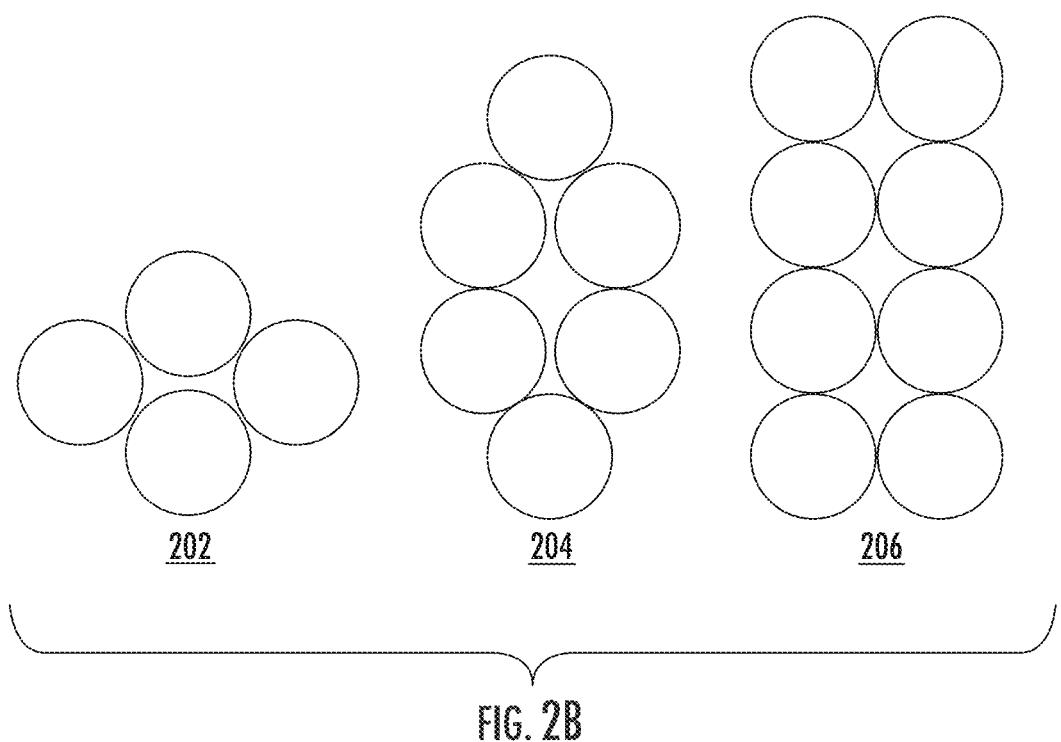
FIG. 2B depicts end views of a four columns cluster, a six columns cluster and an eight columns cluster.

The absence of the column ovens allows the chromatography columns to be arranged in close proximity, such as the cluster 200 shown if FIG. 2A. This arrangement is possible because of the use of insulative technology, such as insulating sleeves as discussed above. This cluster of 4 columns is illustrative and other numbers of chromatography columns may be used and in different configurations. As shown in FIG. 2B, there is an end view 202 of the cluster of four chromatography columns shown in FIG. 2A. FIG. 2B also shows an end view 204 of a cluster of six chromatography columns and an end view 206 of a cluster of eight chromatography columns. These illustrative arrangements are intended to be exemplary and not limiting. Those skilled in the art will appreciate that other arrangements not shown may be used in alternative embodiments.

Figure 3:
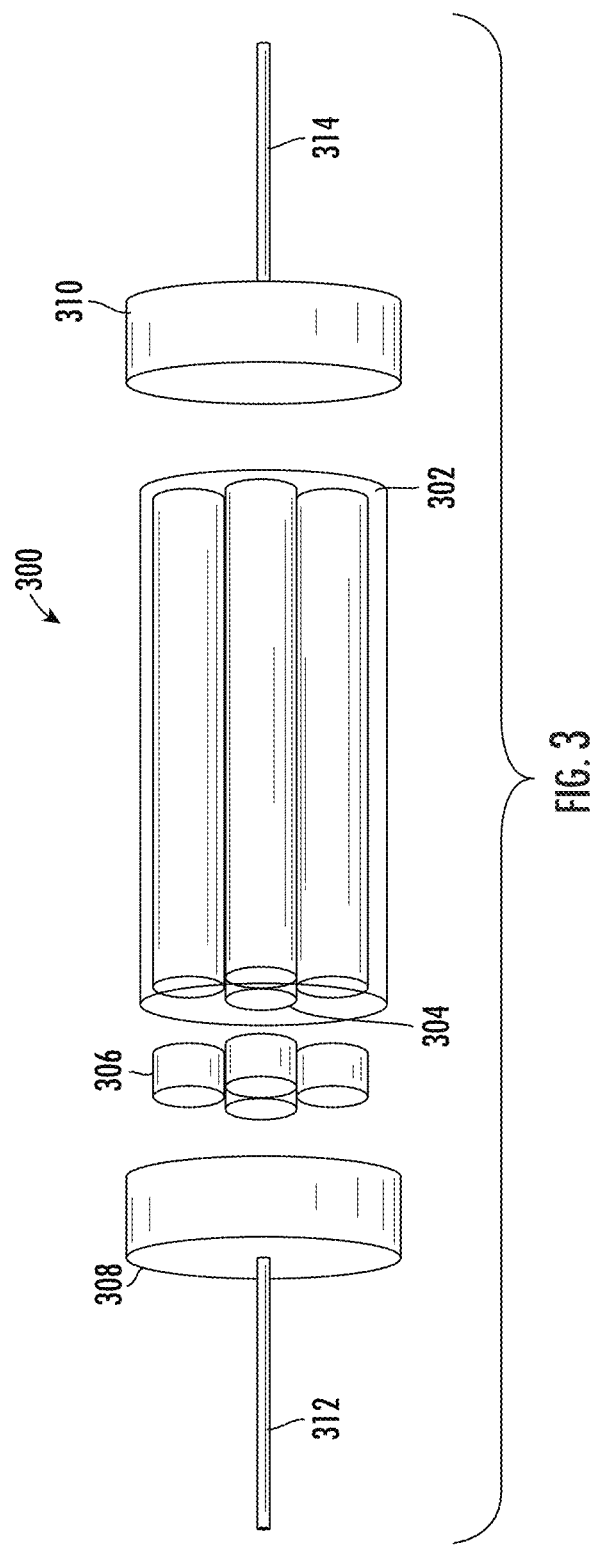
FIG. 3 depicts a first exemplary embodiment of a parallel column arrangement.

FIG. 3 depicts a first exemplary embodiment 300 in which four columns are used in parallel. There are four chromatography columns 304 arranged as previously shown surrounded by an insulating sleeve 302. The insulating sleeve 302 may be include metal or another suitable material. Mobile phase heaters/coolers 306 are provided for each chromatography column 304 to heat or cool the mobile phase entering the chromatography columns 304. Inlet selection valve 308 and outlet selection valve 310 serve as end caps and form a sealed container. The area between the insulating sleeve 302 and the columns 304 may be evacuated to form an insulative vacuum in some embodiments. The inlet selection valve 308 controls the flow of the mobile phase from input tube 312 to the chromatography columns 304. The valve has an interface (such as a port) with the inlet tube 312. The mobile phase may pass to the chromatography columns 304 in parallel. The output selection valve 310 control the flow of output eluting from the chromatography columns 304 to an output tube 314. The output selection valve includes an interface (such as a port) with the output tube 314.

Figure 4A:
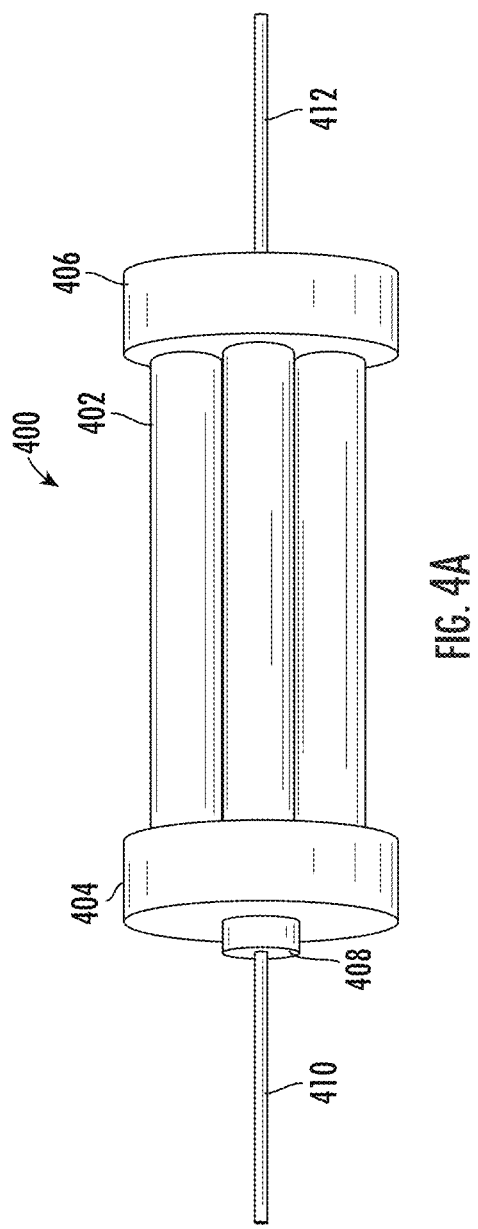
FIG. 4A depicts a second exemplary embodiment of a parallel column arrangement.

FIG. 4A depicts an alternative embodiment 400 in which the chromatography columns are used in parallel, but the inlet selection valve 404 delivers the mobile phase to the chromatography columns 402 one at a time. In this embodiment 400, there is not an insulating sleeve that surrounds all of the chromatography columns 402; rather each of the chromatography columns 402 has its own insulating sleeve. The chromatography columns 402 interface with the inlet selection valve 404 and the outlet selection valve 406, which serve as end caps for the chromatography column arrangement. A single heater/cooler 408 for heating or cooling the mobile phase is provided. The mobile phase with the analyte is received from an inlet tube 410 and heated or cooled by the heater/cooler 408. The inlet selection valve 404 has an interface with the inlet tube 410. The outlet selection valve 406 has an interface with an outlet tube 412 that leads the outlet to a detector, such as found in an MS system.

Figure 4B:
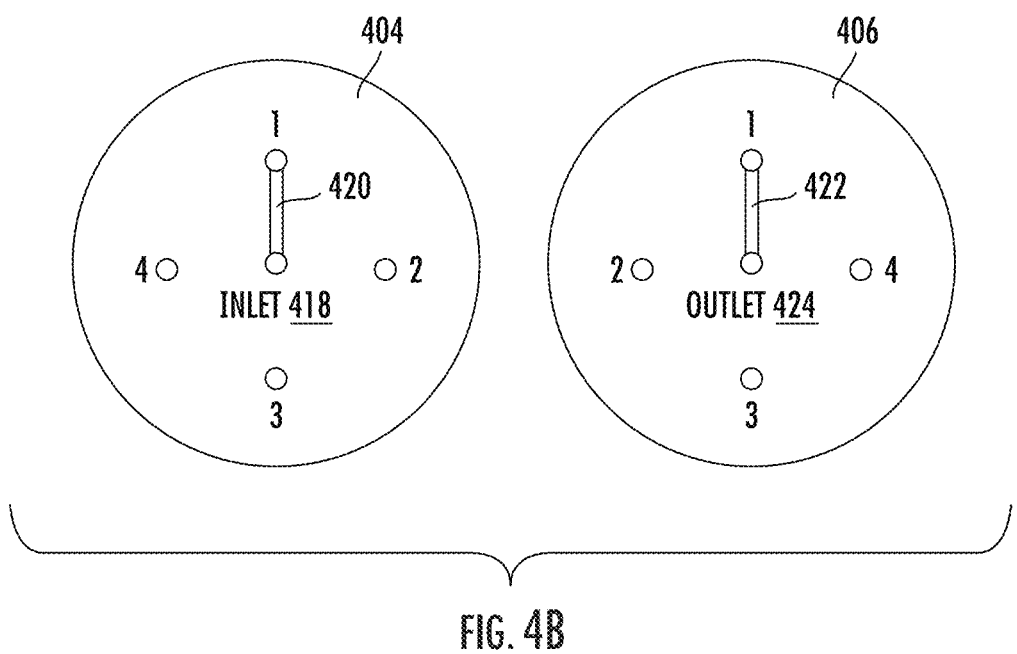
FIG. 4B depicts illustrative valves for the second embodiment.

FIG. 4B shows illustrative versions of the inlet selection valve 404 and the outlet selection valve 406. The inlet selection valve 404 may be, for instance, a flat disk valve having a stator and a rotor. The inlet selection valve 404 may be made of a suitable metal, such as stainless steel. The inlet selection valve 404 may be integrated into a structure of the end cap. As shown, the inlet selection valve 404 includes output ports, numbered 1 through 4, that each lead to a respective one of the chromatography columns 402. The inlet selection valve 404 also has an inlet port 418 located at the center of the valve that is connected to the inlet tube 410. A trace 420 may be rotated to connect the inlet with the output port 1-4 one at a time. In the example shown in FIG. 4B, the trace 402 creates a fluid channel to connect the inlet port 418 with port 1. In this position, the mobile phase enters the inlet selection valve via the inlet port 418, travels through the channel created by trace 420 to output port 1 to the associated chromatography column. In operation, the trace may 420 be rotated via rotation of the rotor via a step motor or other mechanism to successive positions to cause the mobile phase to flow to the chromatography columns in accordance with a sequence, such as column 1, column 2, column 3 and column 4.

The outlet selection valve 406 may be similarly configured as the inlet selection valve 404. The output selection valve 406 may be a flat disk valve with a rotor and a stator. The output selection 406 valve may be made of metal, such as stainless steel. The outlet selection valve 406 has input ports 1-4 that are connected to respective chromatography columns 402 to receive output from the chromatography columns 402. A central outlet port 424 connects with the outlet tube 412. A trace 422 is provided that may connect the outlet port 424 with respective ones of the input ports 1-4. The position of the trace 422 may be moved by rotating the rotor via a step motor or other mechanism. Thus, the output selection valve 406 may connect the outputs of the chromatography columns 402 to the outlet tube 412 in a sequence.

It should be appreciated that more than one valve may be used in place or the singular inlet selection valve 404 or in place of the singular outlet selection valve 406. Moreover, the inlet selection valve 404 and the outlet selection valve 406 need not be flat disk valves. Still further, the input selection valve 404 and the outlet selection valve 406 need not be integrated into the end cap but may be separate and may be coupled to the respective end cap structures. Moreover, as described in more detail below, the inlet selection valve and the outlet selection valve may be integrated into a single selection valve in some embodiments.

Figure 5A:
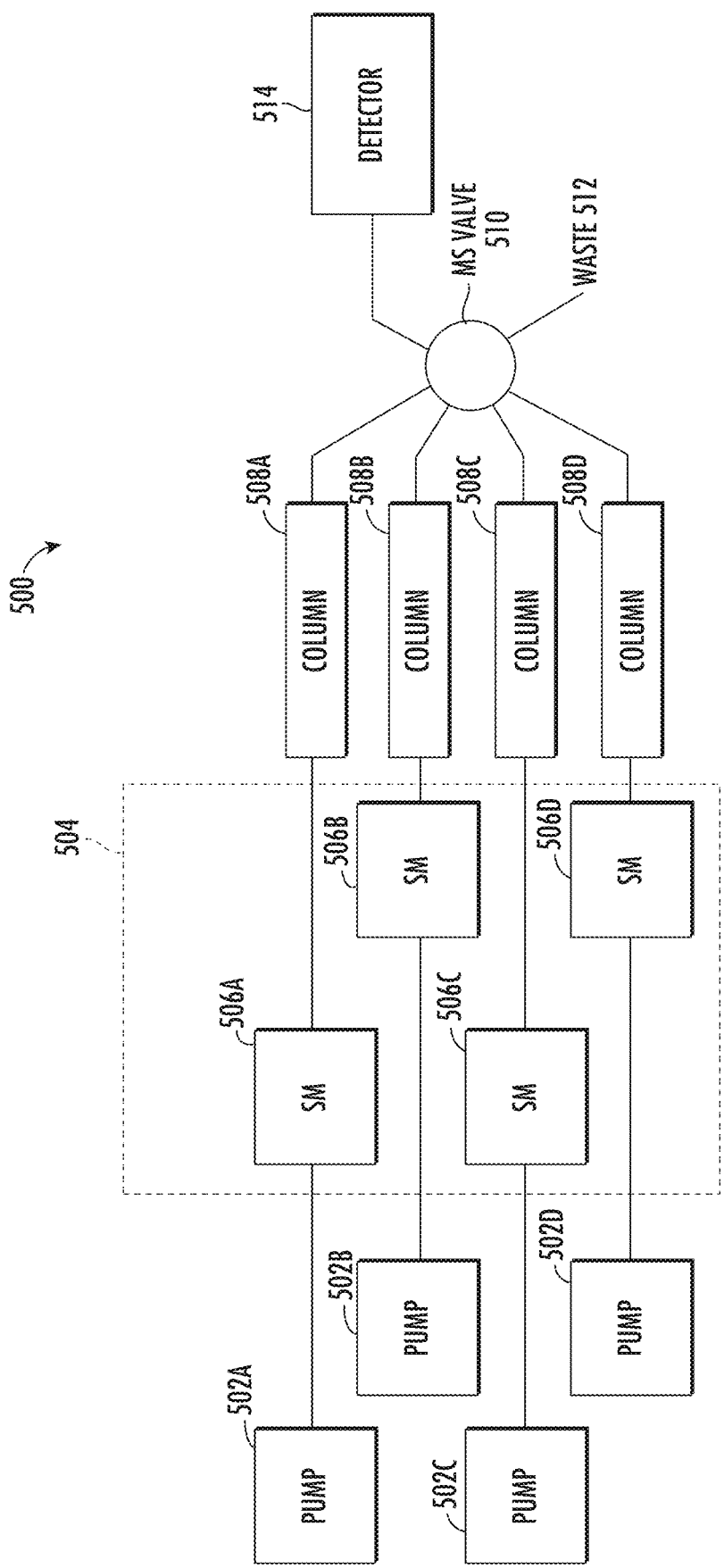
FIG. 5A depicts a block diagram of a high throughput parallel column system.

FIG. 5A depicts a block diagram of another alternative embodiment that provides high throughput. While four chromatography columns are shown in this embodiment, it should be appreciated that a different number of chromatography columns may be used. In this embodiment, separate pumps 502A, 502B, 502C and 502D are provided for each of the chromatography columns 508A, 508B, 508C and 508D. These pumps 502A, 502B, 502C and 502D pump the mobile phase toward the chromatography columns 508A, 508B, 508C and 508D. A sampling stage 504 injects samples into the respective flows via samplers 506A, 506B, 506C and 506D. It should be appreciated that in some embodiments only a single sampler is used. The mobile phase with the samples flows to the respective chromatography columns 508A, 508B, 508C and 508D. The outputs from the chromatography columns 508A, 508B, 508C and 508D pass to a detector 514 under the control of valve 510, which may select the valves in sequence.

Figure 5B:
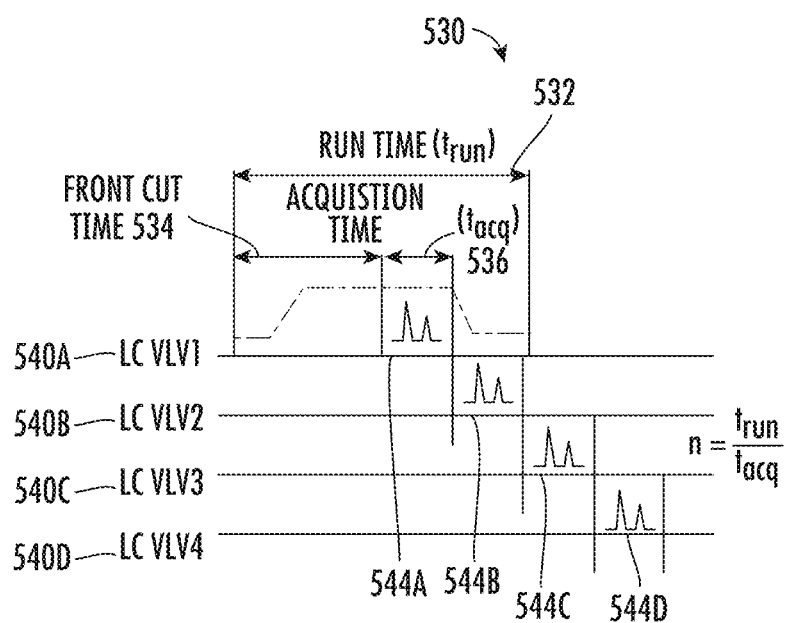
FIG. 5B depicts a plot illustrating pipelining with the high throughput system of FIG. 5A.

The pumps 502A, 502B, 502C and 502D and the samplers 506A, 506B, 506C and 506D may operate to pipeline the flows through the respective columns to improve throughput. Alternatively, a single sampler may be used for all four channels. The timing may be staggered such as depicted in the plot 530 of FIG. 5B. As shown in detail for the row 540A associated with a first column, the time $t_{run}$ 532 that it takes for a run of the chromatography column is shown. This time 532 includes front cut time 534 and acquisition time 536. As can be seen for rows 540A, 540B, 540C and 540D, the samples are delivered in a staggered fashion so that acquisition times 542A, 542B, 542c and 542D for the chromatography columns do not overlap and are closely sequenced. This pipelining approach enhances the throughput of the system.

FIG. 6A depicts an arrangement 600 for such a high throughput system. The arrangement 600 includes chromatography columns 604 closely arranged and encapsulated with an insulating sleeve 602, such as was shown in the embodiment of FIG. 3. The configuration shown in FIG. 6A includes inlet mobile phase heaters/coolers 606 for heating/cooling the mobile phase in proximity to the inlets (e.g., proximal ends) and outlet heaters/coolers 608 for heating/cooling the distal ends of each of the chromatography columns 604. An inlet selection valve 610 selects inputs from inlet tubes 614 and forms an end cap for the arrangement 600. An outlet selection valve 612 selects outputs one at a time from the chromatography columns 604 and forms an outlet end cap. The outlet selection valve 612 directs outputs to an outlet tube 616. In general, the arrangement 600 receives mobile phase with respective samples in a pipelined staggered manner and directs them in pipelined staggered fashion as output to the outlet tube 616.

It should be appreciated that the exemplary embodiments may have inlet heaters/coolers and/or outlet heaters/coolers. The inlet heaters/coolers heat/cool the mobile phase. The outlet heaters heat/cool the distal portion of the chromatography columns.

Figure 6B:
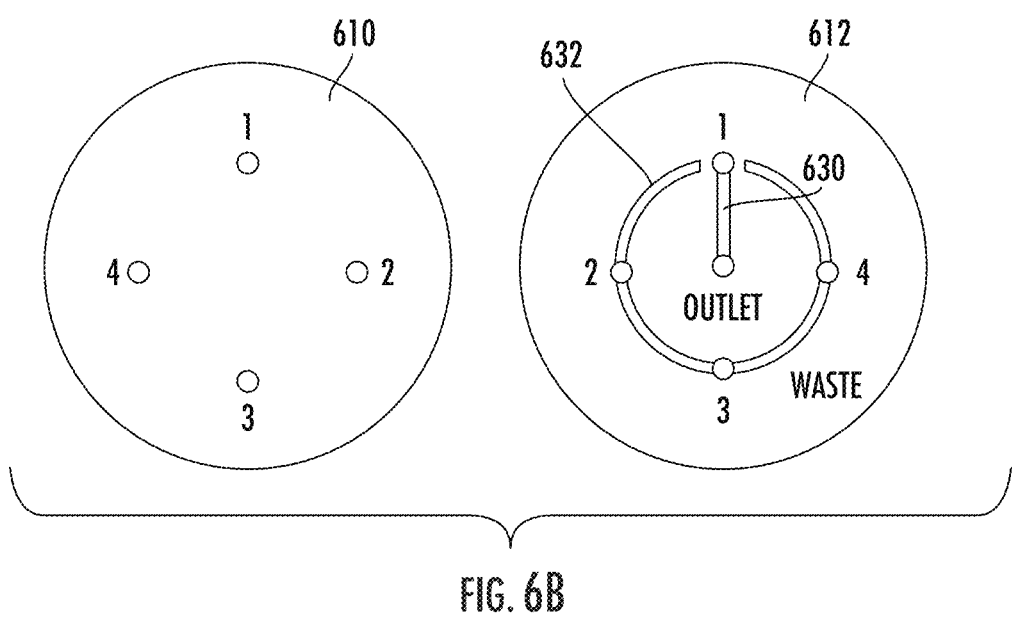
FIG. 6B depicts valves for the third exemplary embodiment.

FIG. 6B shows an illustrative inlet selection valve 610 and an illustrative output selection valve 612. Each of these valves 610 and 612 may be a flat disk valve having a rotor, such as carbon-loaded polyether ether ketone (PEEK) and a stator and may be made of a metal, such as stainless steel. The inlet selection valve 610 has an inlet port (numbered 1 though 4) for each chromatography column 604 to receive input from a respective inlet tube 614. The outlet selection valve 612 has four input ports (numbered 1 through 4) that are each connected to a respective chromatography column 604. A trace 630 connects a one of the input ports to the outlet port leading to the outlet tube 616. In this example, the trace 630 connects port 1 with the outlet port. Hence, in this valve position, the output from the column connected with port 1 passes to the outlet tube 616. A second trace 630 connects ports 2-4 with a waste port that leads to waste. In this position, the output for the chromatography columns 604 connected to ports 2-4 pass to waste. The rotor may be rotated to connect the outlet port to a successive one of the ports 2-4, while connect the other ports to waste. Alternatively, in some embodiments the chromatography columns may act as a rotor and collectively rotate like a revolver.

The above-described exemplary embodiments rely upon valves to direct flow into and out of the chromatography columns. In some alternative embodiments, the end caps, clamps or other connectors that provide connections to an inlet flow and an outlet flow may be moved relative to stationary chromatography columns to direct the flow to successive chromatography columns in a parallel chromatography columns arrangement. FIGS. 7A-7D depict an illustrative arrangement for an exemplary embodiment.

Figure 7A:
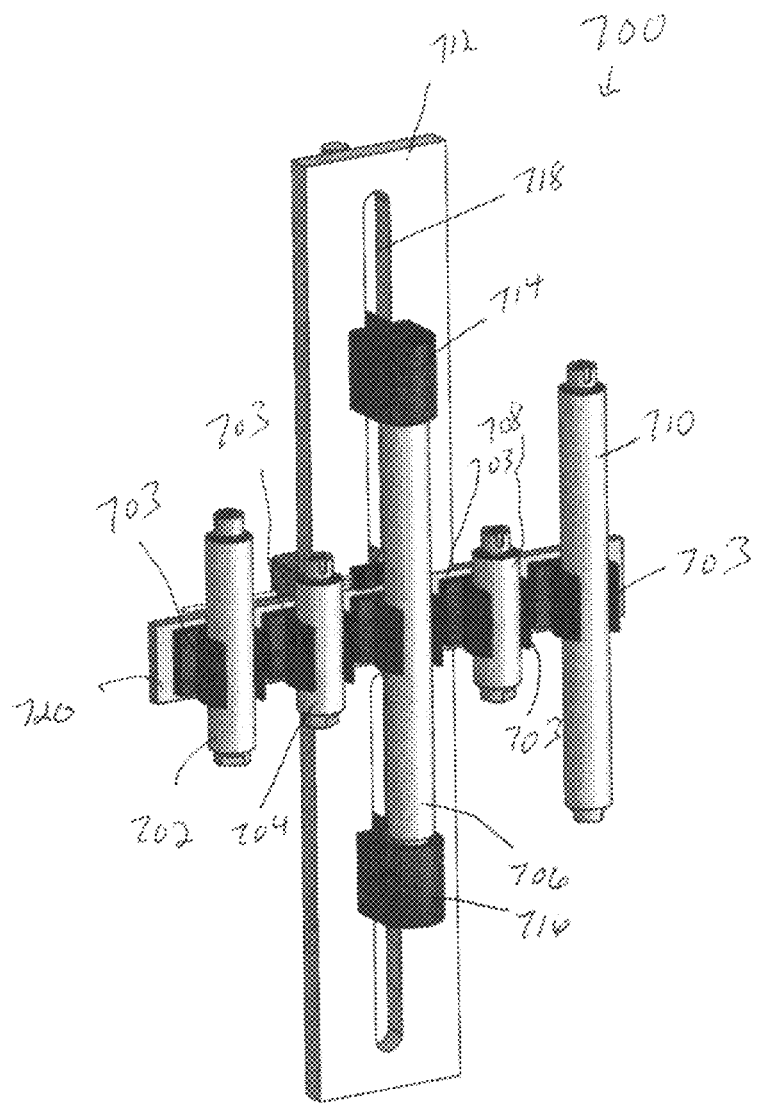

In the illustrative parallel chromatography columns arrangement 700 of FIG. 7A, there are chromatography columns 702, 704, 706, 708 and 710. As can be seen, the chromatography columns 702, 704, 706, 708 and 710 may be of varying lengths and/or diameters. The chromatography columns 702, 704, 706, 708 and 710 may be held fixedly by clamps 703. Slidable connectors 714 and 716 are secured to chromatography column 706 in FIG. 7A. Slidable connector 714 is secured to the inlet end of chromatography column 706, and slidable connector 716 is secured to the outlet end of the chromatography column 706. The slidable connector 716 may include integrated fluidic connections (not shown), such as fluid carry tubes, for carrying a mobile phase with an analyte sample into the inlet of the chromatography column 706 and for carrying the fluidic output from the outlet of the chromatography column 706. The slidable connectors 714 and 716 may include interface structures for creating a fluidic seal with the inlet and the outlet of the chromatography column 706.

Figure 7B:
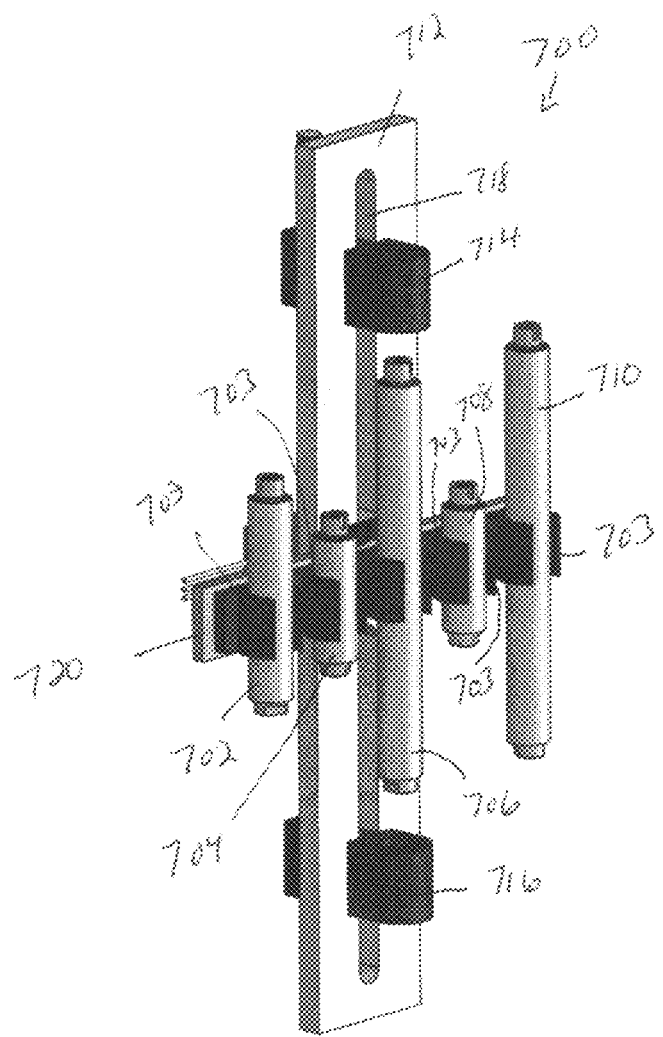
Figure 7C:
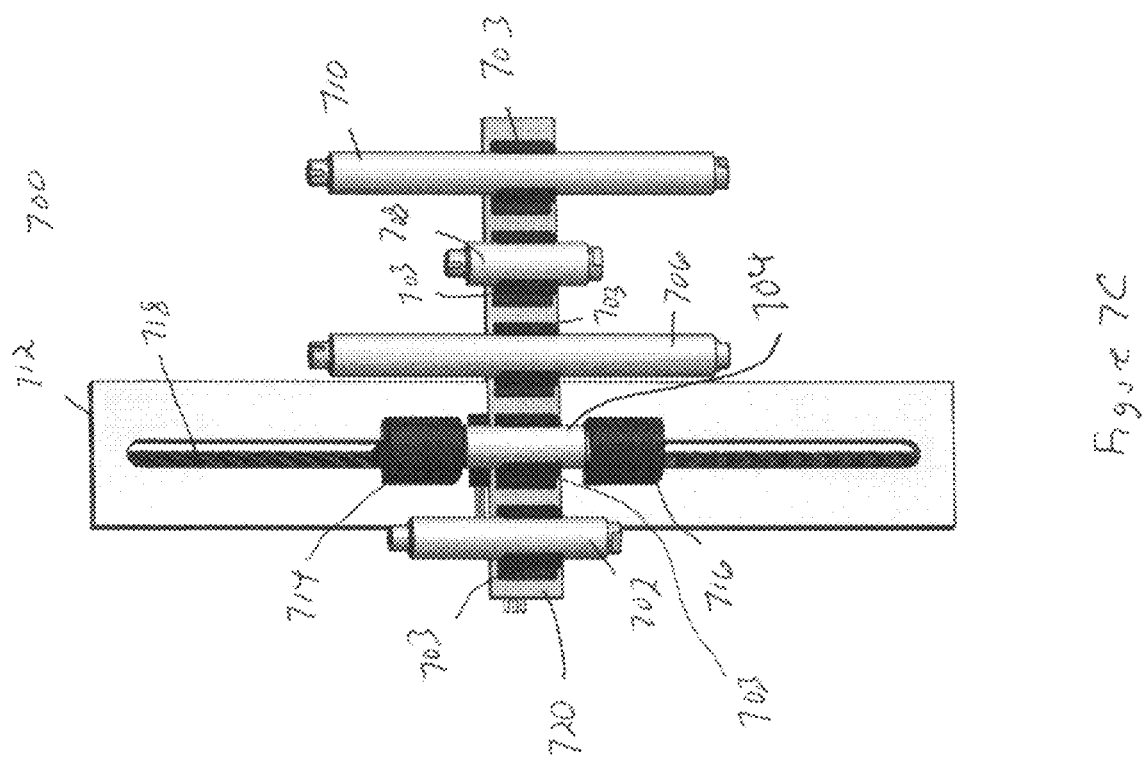

The slidable connectors 714 and 716 may slide within a slot 718 provided on a platform 712. In FIG. 7A, the slidable connectors 714 and 716 have been slid into position to create a connection with chromatography column 706. Once one is done using chromatography column 706, the slidable connectors 714 and 716 may be retracted as shown in FIG. 7B. The retraction breaks the fluidic connections with chromatography column 706 and moves the slidable connections outside of the longitudinal lengths of the chromatography columns to enable the platform 712 to be moved into position for the next chromatography column. For example, FIG. 7C shows the platform has been moved to be in position for chromatography column 704. The slidable connectors 714 and 716 have been slid into positions for connecting with the inlet end and the outlet end of chromatography column 704.

FIG. 7D shows a view of the rail assembly 720 on which the platform 712 may laterally move to be in position for the respective columns 702, 704, 706, 708 and 710. The platform 712 may ride on a rail or other structure that is part of the rail assembly 720. A motor of other drive mechanism (not shown) may be used to move the platform 712 along the rail assembly 720. In some embodiments, a column tracking and identification mechanism may be used. One example is to use a radio frequency identification (RFID). For instance, a RFID tag 734 may be provided at each column position. The drive mechanism may include an RFID reader to read the tags to know where to move the platform 712 based on RFID. Other tracking and identification mechanisms may be used.

FIG. 7D also shows an illustrative mechanism for sliding the slidable connectors 714 and 716 within the slot 718. A lead screw 730 is rotated by a motor 732 to linearly actuate the connectors within the slot 718. The slidable connectors 714 and 716 may be moved into position to create a connection with a chromatography column or moved into position to disengage a connection with a chromatography column. The lead screw rotation causes the slidable connectors to move together either toward the column inlet and outlet or away from the column inlet/outlet.

In other alternative embodiments, the connectors, like 714 and 716, are not moved; rather the chromatography columns are moved into position to connect with the connectors and then moved into position to disconnect from the connectors. Moreover, although the chromatography columns are arranged in a planar configuration in FIGS. 7A-7D, it should be appreciated that in alternative embodiments, the chromatography columns may be arranged in non-planar arrangements, such as, for example, the arrangements of FIG. 2B.

Figure 8A:
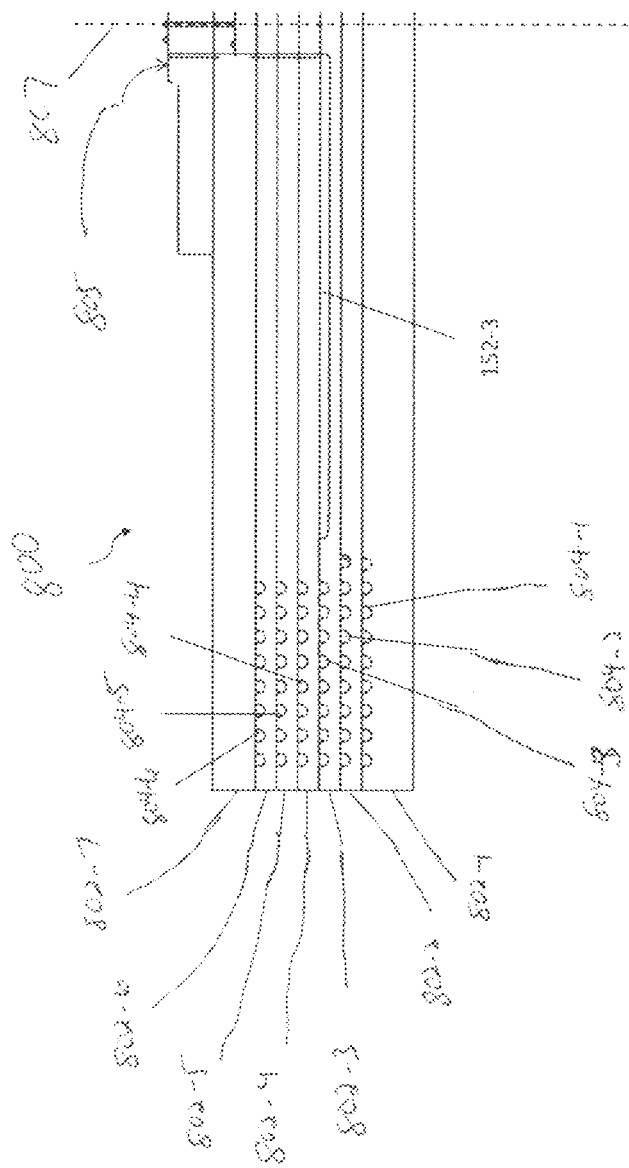
FIGS. 8A and 8B depicts illustrative portions of a single selection valve that may be used in exemplary embodiments instead of an inlet selection valve and an outlet selection valve.

Instead of using a separate inlet selection valve and outlet selection valve, a single selection valve may be used that provides the functionality of the two valves in exemplary embodiments. FIG. 8A shows a cross-sectional side view of a stator that is part of a stator array of an illustrative selection valve. The selection valve includes a rotor body that will be described below relative to FIGS. 9A and 9B. Each stator surface is configured to engage and seal against a rotor surface of a corresponding rotary valve. Each stator surface includes stator ports to communicate with rotor ports. In some instances, there is at least one fluid channel inside the stator body that couples a stator port in one of the stator surfaces (i.e., stator "faces") with a stator port in another one of the stator surfaces.

The stator array avoids the need to use a large number of tubes to provide fluidic connections between two or more rotary valves. Instead, stator ports in different stator surfaces are internally coupled to each other within a single block that includes the stator surfaces for the rotary valves. By eliminating most of the tubing connections, the array is more robust and leaks and possible contamination points are significantly reduced. In addition, chromatographic band dispersion and peak tailing can be reduced as the volumes associated with tubing connectors are eliminated. The block can be fabricated from individual layers of material using a diffusion bonding technique.

The stator body 800 is formed from a plurality of layers 802 into a single body. In this illustrative depiction, seven layers 802-1 to 802-7 are diffusion bonded together to create the single body having multiple sample channels 804 (804-1 to 804-7). Additional layers (not shown) may be provided and may include openings to accept external fittings and to provide features such as attachment features to facilitate attachment of the rotary valves. The layers 802-2 are parallel to each other and to one or more external device surfaces.

Figure 8B:
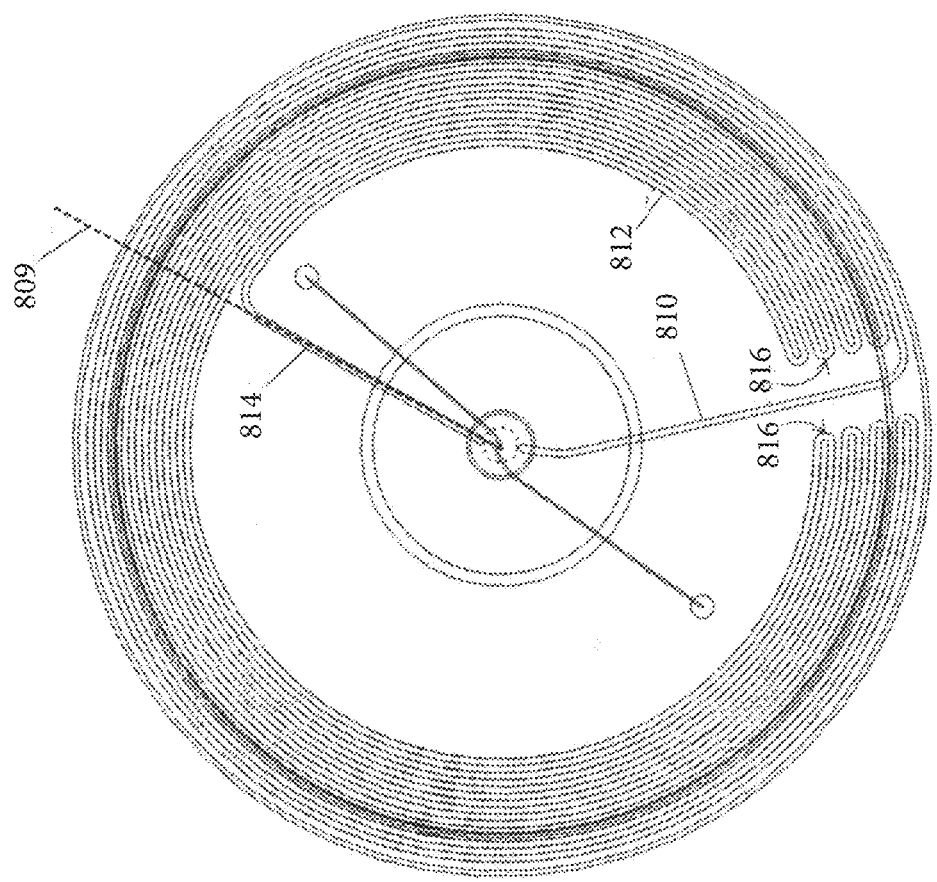

Each sample channel is disposed at a unique interface of two of the layers 802. For example, sample channel 804-3 is formed at the interface of layers 802-3 and 802-4. Although the reference numbers 804-$n$ (where n identifies a particular sample channel) are associated with lines directed to a single opening, it will be appreciated that all the openings at that interface are part of the same sample channel. The interfaces are parallel to each other and to the external surfaces of the stator body. FIG. 8B shows a top cross-sectional view at the interface of layers 802-3 and 802-4 of a larger portion of the stator body 800 where the dashed line 809 indicates the location of the cross-sectional view of FIG. 8A. Thus, FIG. 8B shows only a single sample channel.

Each sample channel 804 includes a hybrid serpentine arc (HAS)-shaped segment 808 with a radial channel segment 810 coupling one end of the HAS-shaped segment 812 to a vertical channel segment that extends to a port on the stator surface 805. A second radial channel segment 814 couples the other end of the HAS-shaped segment 812 to another port on the stator surface 805 through another vertical channel segment. Each HAS-shaped segment 812 has the same shape but is oriented at a different angular position with respect to a rotation about an axis 807. For example, the angular positions may be separated equally in angle by 60°. The illustrated HAS-shaped segment 812 is defined by a series of circumferential paths of less than 360° where, other than the innermost and outmost circumferential paths, each circumferential path is coupled to an adjacent path by a turning section 816. Each circumferential path is defined by a radius of curvature that is different than the radii of curvature of the other circumferential paths. This geometrical arrangement of the HAS-shaped segment 812 allows for a significant volume of sample to be stored. For example, the sample channels 804 may each have a volume of 250 µL.

Figure 9A:
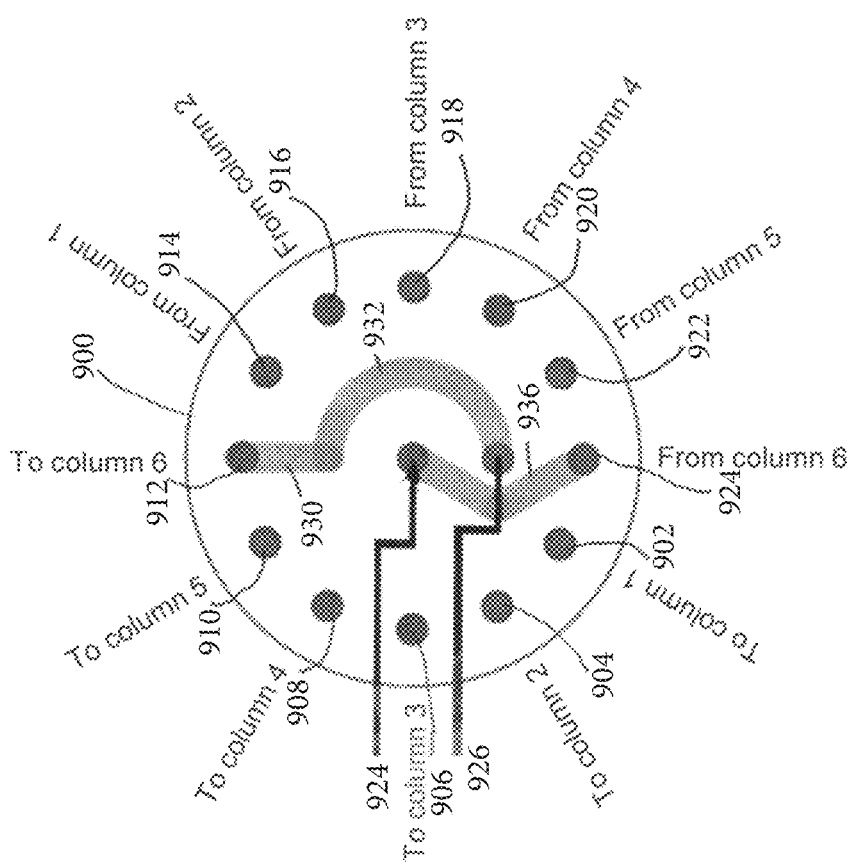
FIGS. 9A and 9B depicts illustrative rotors suitable for use with a single selection valve in exemplary embodiments.

FIG. 9A depicts an illustrative rotor 900 suitable for use with a single selection valve rather than two selection valves. The selection valve may have a stator body like that of FIG. 8A or 8B or may have an alternative stator body configuration. If the stator body has a configuration like that of FIGS. 8A and 8B, the internal volumes of the sample loops may be packed with chromatographic media in some embodiments to act as chromatography columns. Alternatively, the chromatography columns may be attached externally via fluidic connection tubes.

The rotor 900 will be described below relative to an embodiment with external column connections. The rotor 900 includes ports 902, 904, 906, 908, 910 and 912 that lead to respective chromatography columns numbered 1 through 6. These ports 902, 904, 906, 908, 910 and 912 are connected by fluid conduits, such as tubes, to the inlets of the chromatography columns 1-6. Ports 914, 916, 918, 920, 922 and 924 are connected via fluid conduits, such as tubes, to the outlets of the respective chromatography columns 1-6. Port 926 is connected via a fluid conduit to a sample introduction source. Port 924 is connected via a fluid conduit to a detection mechanism, like an optical detector or mass spectrometer.

The rotor 900 may rotate among different angular positions to connect traces 930, 932 and 936 to ports. The positions allow the sample in a mobile phase to be introduced to a chromatography column via a first port and the output from the chromatography column subsequently received at another port. The output may be passed on to a detection mechanism via a final port. For the rotor position shown in FIG. 9A, the mobile phase with the sample is received via port 926, passes through traces 932 and 930 on a stator and out port 912 to column 6. The output from the outlet of column 6 is received at port 924. The output passes via trace 936 to port 924 on to the detection.

Figure 9B:
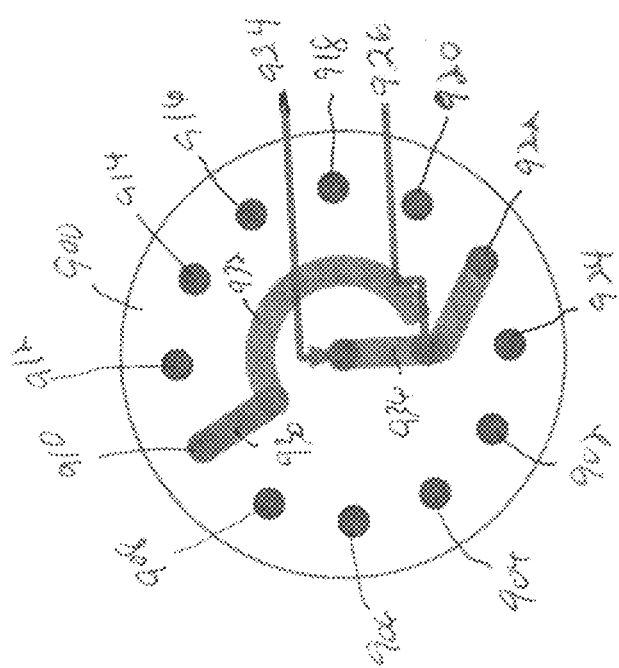

The rotor 900 may have six positions (i.e., one for each column) for connecting the sample introduction with a chromatography column and passing the output from the respective chromatography column to detection. The rotor 900 also may have a seventh position, as shown in FIG. 9B. This seventh position is a bypass position where the mobile phase bypasses the columns and flows to waste. The mobile phase is received at port 924 and is output via port 926 to waste.

Figure 10A:
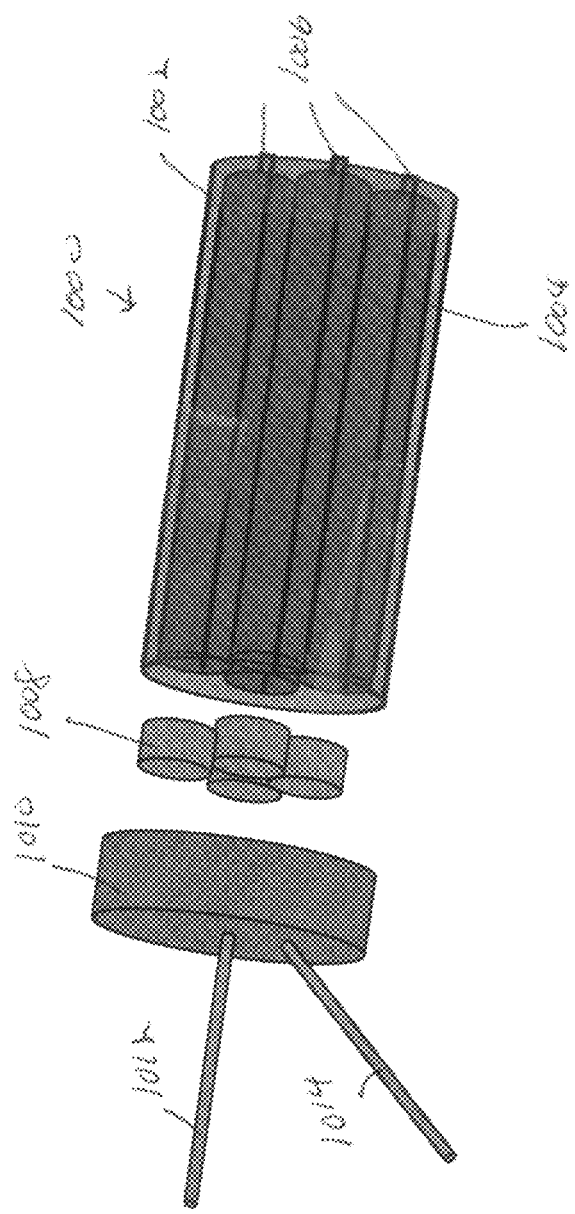
FIG. 10A depicts a fifth exemplary embodiment of a parallel column arrangement using a single selection valve and a single insulating sleeve.

FIG. 10A depicts an illustrative chromatography columns arrangement 1000 where four columns 1004 are used in parallel and a single selection valve, such as that of FIGS. 8A, 8B, 9A and 9B, is used. There are four chromatography columns 1004 arranged as shown surrounded by an insulating sleeve 1002. Each chromatography column 1004 includes a return line 1006 for returning the output of the chromatography column to the selection valve 1010. The insulating sleeve 1002 may be include an outer shell made of steel, titanium or another suitable material. Mobile phase heaters/coolers 1008 are provided for each chromatography column 1004 to heat or cool the mobile phase entering the chromatography columns 1004. Selection valve 1010 serves as an end cap and forms a sealed container. The area between the insulating sleeve 1002 and the columns 1004 may be evacuated to form an insulative vacuum in some embodiments. The selection valve 1010 controls the flow of the mobile phase from input tube 1012 to the chromatography columns 1004. The selection valve 1010 has an interface (such as a port) with the inlet tube 1012. The mobile phase with an analyte sample may pass to the chromatography columns 1004 in parallel. The selection valve 1010 controls the flow of output eluting from the chromatography columns 1004 to an output tube 1014. The selection valve 1010 includes an interface (such as a port) with the output tube 1014 that may lead to detection.

FIG. 10B depicts an alternative embodiment 1020 in which the chromatography columns are used in parallel and a single selection valve is used. In this embodiment 1020, there is not an insulating sleeve that surrounds all of the chromatography columns 1022; rather each of the chromatography columns 1022 has its own insulating sleeve. Each chromatography column 1022 includes a return line 1006 for returning the output of the chromatography column to the selection valve 1010 The chromatography columns 1022 interface with the selection valve 1010, which serve as an end cap for the chromatography columns arrangement. A single heater/cooler 1024 for heating or cooling the mobile phase is provided. The mobile phase with the analyte is received from an inlet tube 1012 and heated or cooled by the heater/cooler 1024. The selection valve 1010 has an interface with the inlet tube 1012. The selection valve 1010 has an interface with an outlet tube 1014 that may lead to a detector.

While exemplary embodiments have been described herein, various changes in form and detail may be made without departing from the intended scope as defined in the appended claims.

The invention claimed is:

1. A chromatography columns arrangement, comprising:
   a plurality of chromatography columns, each of the chromatography columns having an inlet and an outlet;
   a vacuum insulating sleeve surrounding the plurality of chromatography columns to insulate the plurality of chromatography columns, wherein an area between the vacuum insulating sleeve the plurality of chromatography columns is evacuated to form an insulative vacuum;
   an inlet selection valve positioned at inlet ends of the chromatography columns in the plurality for controlling input of mobile phase and analyte to the chromatography columns, wherein the inlet selection valve interfaces with the insulating sleeve and serves as an inlet end cap for the arrangement; and an outlet selection valve positioned at outlet ends of the chromatography columns in the plurality for controlling output of the mobile phase and the analyte from the chromatography columns, wherein the output selection valve interfaces with the insulating sleeve and serves as an outlet end cap for the arrangement.

2. The chromatography columns arrangement of claim 1, further comprising mobile phase heaters positioned before the inlets of the chromatography columns for heating the mobile phase.

3. The chromatography columns arrangement of claim 1, wherein the inlet selection valve has an inlet interface for interfacing with an inlet tube for inputting the mobile phase and the analyte.

4. The chromatography columns arrangement of claim 1, wherein the outlet selection valve has an outlet interface for interfacing with an outlet tube for outputting the mobile phase and the analyte.

5. The chromatography columns arrangement of claim 1, wherein there are 2 chromatography columns, 4 chromatography columns, 6 chromatography columns or 8 chromatography columns in the plurality of chromatography columns.

6. The chromatography columns arrangement of claim 1, wherein the inlet selection valve is configured to pass the mobile phase and the analyte in parallel to the chromatography columns in the chromatography column arrangement.

7. The chromatography columns arrangement of claim 1, wherein the inlet selection valve has an inlet interface for each respective chromatography column in the plurality of chromatography columns, wherein each of the inlet interfaces is for interfacing with a respective inlet tube for inputting the mobile phase and the analyte to the respective chromatography column.

8. The chromatography columns arrangement of claim 7, wherein the inlet selection valve is configured to input the mobile phase and the analyte via the respective inlet tubes to the respective chromatography columns in parallel.

9. The chromatography column arrangement of claim 7, wherein the output selection valve has an analyte outlet interface for interfacing with an analyte outlet tube for outputting the analyte from the plurality of chromatography columns and a mobile phase interface for interfacing with a waste output tube leading to waste for outputting the mobile phase from the plurality of chromatography columns.

10. A chromatography columns arrangement, comprising:
a plurality of chromatography columns, each of the chromatography columns having an inlet and an outlet, and each of the chromatography columns having a separate insulating sleeve;
an inlet selection valve positioned at inlet ends of the chromatography columns in the plurality for controlling input of mobile phase and analyte to the chromatography columns, wherein the input selection valve is configured to only allow one of the chromatography columns at a time to receive the mobile phase and the analyte as input and wherein the inlet selection valve interfaces with the insulating sleeves and serves as an inlet end cap for the arrangement; and
an outlet selection valve positioned at outlet ends of the chromatography columns in the plurality for controlling output of the mobile phase and the analyte from the chromatography columns wherein the outlet selection valve interfaces with the insulating sleeves and serves as an outlet end cap for the arrangement.

11. The chromatography columns arrangement of claim 10, wherein the outlet selection valve is configured to select as output the mobile phase and analyte exiting the outlet of a single one of the chromatography columns in the plurality at a time.

12. The chromatography columns arrangement of claim 10, wherein the inlet valve contains an inlet interface with an inlet tube for carrying the mobile phase and the analyte.

13. The chromatography columns arrangement of claim 12, further comprising at least one inlet mobile phase heater for heating the mobile phase and the analyte prior to being input to the chromatography columns arrangement.

14. The chromatography columns arrangement of claim 10, further comprising an inlet selection valve controller for controlling the inlet selection valve so as to select each of the chromatography columns in the plurality to receive the input mobile phase and analyte in accordance with a sequence.

15. The chromatography columns arrangement of claim 10, wherein at least one of the insulating sleeves is a vacuum sleeve, a sleeve of insulating material or a sleeve containing gas.

* * * * *